US012616992B2

(12) United States Patent
Yao et al.

(10) Patent No.: US 12,616,992 B2
(45) Date of Patent: May 5, 2026

(54) ATOMIZATION MODULE

(71) Applicant: HCMed Innovations Co., LTD., Taipei City (TW)

(72) Inventors: Chang-Hsieh Yao, Taipei City (TW); Hsun-Wei Chiang, Taoyuan City (TW); Chia-Chien Chang, New Taipei City (TW); Hsin-Yi Pai, New Taipei City (TW); Chun-Chia Juan, New Taipei City (TW)

(73) Assignee: HCMed Innovations Co., LTD., Taipei City (TW)

( * ) Notice: Subject to any disclaimer, the term of this patent is extended or adjusted under 35 U.S.C. 154(b) by 245 days.

(21) Appl. No.: 18/479,798

(22) Filed: Oct. 2, 2023

(65) Prior Publication Data

US 2024/0123463 A1 Apr. 18, 2024

Related U.S. Application Data

(60) Provisional application No. 63/416,593, filed on Oct. 16, 2022.

(30) Foreign Application Priority Data

Jun. 15, 2023 (CN) ........................ 202310707257.X

(51) Int. Cl.
*B05B 17/06* (2006.01)

(52) U.S. Cl.
CPC ................................ *B05B 17/0653* (2013.01)

(58) Field of Classification Search
CPC ............ B05B 17/0653; B05B 17/0638; B05B 17/0646; B05B 17/0607; B05B 15/18; A61M 11/006; A61M 2205/0294; B06B 1/0644; B06B 2201/77
See application file for complete search history.

(56) References Cited

U.S. PATENT DOCUMENTS

| | | | | |
|---|---|---|---|---|
| 11,376,375 | B2 * | 7/2022 | Hijlkema | A61M 15/0085 |
| 2004/0050947 | A1 * | 3/2004 | Power | A61M 11/005 239/102.1 |
| 2010/0319685 | A1 * | 12/2010 | Yu | B05B 17/0646 128/200.14 |
| 2016/0310981 | A1 * | 10/2016 | Von Hollen | B05B 17/0646 |
| 2016/0310982 | A1 * | 10/2016 | Von Hollen | A61M 16/0054 |
| 2019/0001366 | A1 * | 1/2019 | Von Hollen | B05B 17/0646 |

* cited by examiner

*Primary Examiner* — Christopher R Dandridge
(74) *Attorney, Agent, or Firm* — Li & Cai Intellectual Property Office

(57) ABSTRACT

An atomization module includes a main fixing member, an auxiliary fixing member, an atomization component and a piezoelectric component. The main fixing member includes a first bonding part, a second bonding part and a connecting part. The first bonding part has a first opening and a first bonding surface surrounding the first opening. The second bonding part is connected to the first bonding part, and the connecting part and the second bonding part surround the first bonding part. The auxiliary fixing member has a second opening and a second bonding surface surrounding the second opening. The piezoelectric component surrounds the first bonding part. The main fixing member has a first adhesive groove, which is jointly defined at least by the main fixing member, the auxiliary fixing member and the atomization component. The first adhesive is provided in the first adhesive groove.

18 Claims, 17 Drawing Sheets

ATOMIZATION MODULE

CROSS-REFERENCE TO RELATED PATENT APPLICATION

This application claims the benefit of priority to Patent Application No. 202310707257.X, filed on Jun. 15, 2023, in the People's Republic of China. The entire content of the above identified application is incorporated herein by reference.

This application claims the benefit of priority to the U.S. Provisional Patent Application Ser. No. 63/416,593, filed on Oct. 16, 2022, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an atomization module, and more particularly to an atomization module capable of improving structural strength.

BACKGROUND OF THE DISCLOSURE

A nebulizer atomizes medicinal liquid through an internal atomization component to form and spray an aerosol. The atomization component vibrates to convert the medicinal liquid into the aerosol with tiny droplets by powering a piezoelectric component of an atomization component inside.

However, bonding surfaces between the atomization component and a support member may be easily peeled off under long-term vibration of the atomization component, resulting in gaps, moisture permeation or even peeling of the atomization component, which further affects service life of the atomization component. Moreover, any such moisture permeation into the atomization component can easily result in short circuits between positive and negative electrodes of the piezoelectric component.

Therefore, improving a structural design of the atomization component to increase structural strength and avoid forming short circuits between the positive and negative electrodes of the piezoelectric component has become one of important issues to be addressed in the relevant art.

SUMMARY OF THE DISCLOSURE

In response to the above-referenced technical inadequacies, the present disclosure provides an atomization module capable of addressing peeling issues due to vibration of the atomization component.

In one aspect, the present disclosure provides an atomization module, which includes a main fixing member, an auxiliary fixing member, an atomizing unit and a piezoelectric component. The main fixing member includes a first bonding part, a second bonding part and a connecting part. The first bonding part has a first opening and a first bonding surface surrounding the first opening. The second bonding part is connected to the first bonding part through the connecting part, and the connecting part and the second bonding part surround the first bonding part. The auxiliary fixing member is disposed on the first bonding part, and has a second opening and a second bonding surface surrounding the second opening. The second bonding surface faces the first bonding surface. The atomization component is disposed between the main fixing member and the auxiliary fixing member. The piezoelectric component is disposed on the second bonding part and surrounds the first bonding part. The main fixing member has a first adhesive groove, and the main fixing member, the auxiliary fixing member and the atomization component jointly define at least the first adhesive groove. A first adhesive that contacts at least the main fixing member, the auxiliary fixing member and the atomization component is provided in the first adhesive groove.

Therefore, in the atomization module provided by the present disclosure, the first adhesive groove can be filled with adhesive to increase bonding strengths among the main fixing member, the atomization component, and the auxiliary fixing member, thereby strengthening an overall structure of the atomization module. In addition, moisture can be prevented from penetrating through bonding interfaces among the atomization component, the main fixing member, and the auxiliary fixing member, so as to avoid short circuits between the positive and negative electrodes of the piezoelectric component due to moisture permeation.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
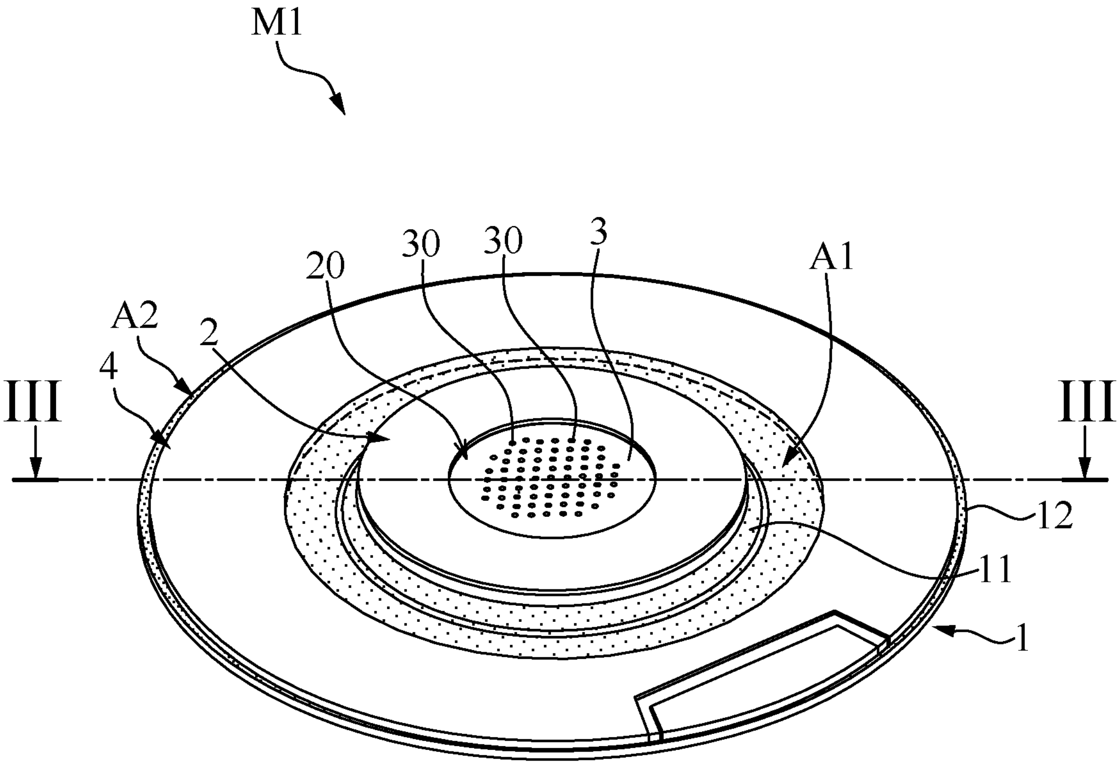
FIG. 1 is a schematic diagram of an atomization module according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
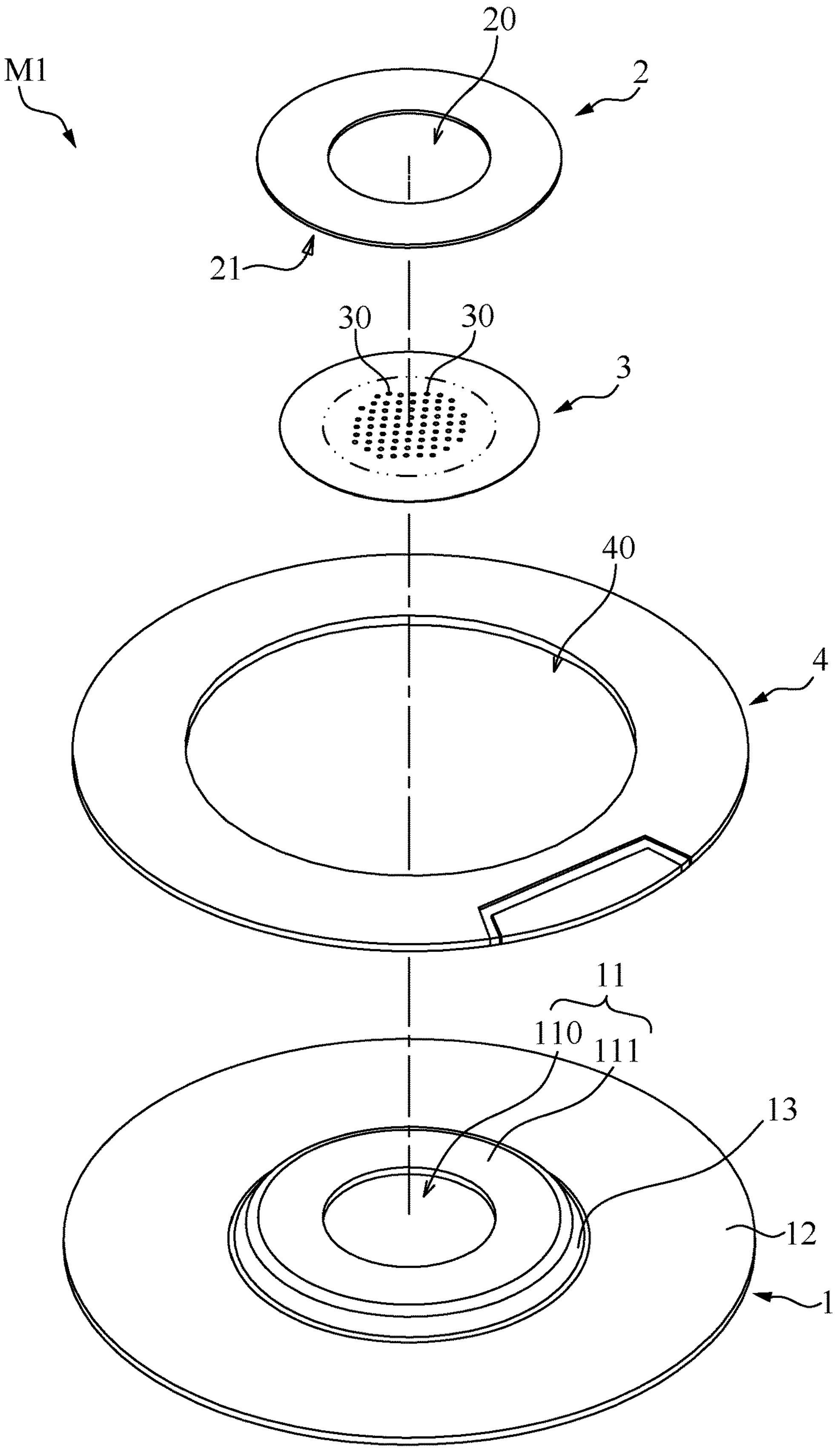
FIG. 2 is an exploded schematic view of the atomization module according to the first embodiment of the present disclosure.

FIG. 1 is a schematic diagram of an atomization module according to a first embodiment of the present disclosure, and FIG. 2 is an exploded schematic view of the atomization module according to the first embodiment of the present disclosure. Reference is made to FIG. 1 and FIG. 2, the first embodiment of the present disclosure provides an atomization module M1, which includes a main fixing member 1, an auxiliary fixing member 2, an atomization component 3 and a piezoelectric component 4. The main fixing member 1 includes a first bonding part 11, a second bonding part 12 and a connecting part 13. As shown in FIG. 1 and FIG. 2, the first bonding part 11 has a first opening 110 and a first bonding surface 111 surrounding the first opening 110.

Figure 3:
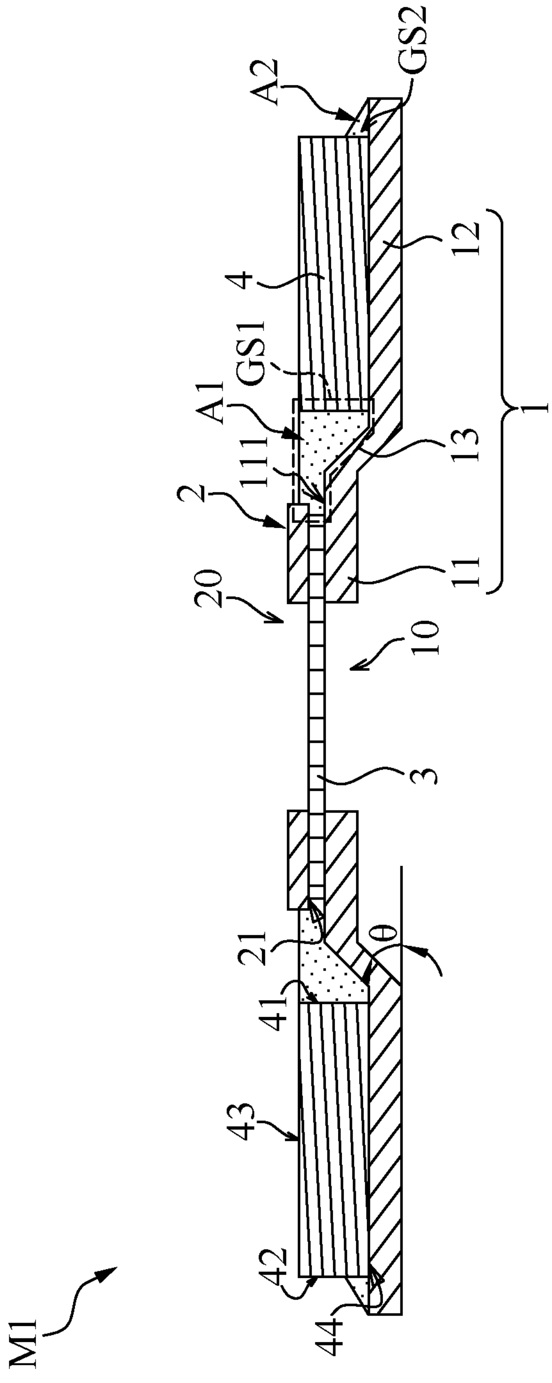
FIG. 3 is a schematic cross-sectional view of a first aspect taken along line III-III of FIG. 1.

Reference is made to FIG. 3. FIG. 3 is a schematic cross-section view of a first aspect taken along line III-III of FIG. 1. The second bonding part 12 is connected to the first bonding part 11 through the connecting part 13, and the connecting part 13 and the second bonding part 12 surround the first bonding part 11. In detail, the first bonding portion 11 is used to dispose the atomization component 3, the second bonding portion 12 is used to dispose the piezoelectric component 4, and the connecting portion 13 can be inclined relative to the first bonding part 11 and the second bonding part 12. For example, the connecting portion 13 can be a support slope disposed between the first bonding part 11 and the second bonding part 12, and the connecting portion 13 has an inclination angle θ relative to a virtual horizontal plane that is coplanar with the second bonding part 12. In this way, when the piezoelectric component 4 vibrates on the second bonding part 12, kinetic energy can be transmitted to the atomization component 3 through the connecting part 13 and the first bonding part 11. Since the connecting portion 13 retains a degree of freedom of the first bonding part 11 in a vibration direction, the atomization component 3 can vibrate with better efficiency. In one preferred embodiment, an inclination angle θ can be, for example, between 35 degrees and 45 degrees, and such range can provide better kinetic energy transmission efficiency.

In addition, in this embodiment, the auxiliary fixing member 2 is disposed on the first bonding part 11 and has a second opening 20 and a second bonding surface 21 surrounding the second opening 20, and the second bonding surface 21 faces the first bonding surface 111. The atomization component 3 is disposed between the first bonding part 11 of the main fixing member 1 and the auxiliary fixing member 2. More precisely, the auxiliary fixing member 2 and the atomization component 3 are stacked on the first bonding surface 111 of the first bonding part 11. From an appearance of the main fixing member 1, the first bonding part 11 of the main fixing member 1 is a raised platform. In addition, the atomization component 3 includes a plurality of through holes 30 (as shown in FIG. 1 and FIG. 2). When the main fixing member 1, the auxiliary fixing member 2 and the atomization component 3 form the atomizing module M1, the first opening 110 communicates with the second opening 20 through the plurality of through holes 30.

On the other hand, the piezoelectric component 4 is disposed on the second bonding part 12 and surrounds the first bonding part 11. In the present embodiment, however, the piezoelectric component 4 and the atomization component 3 are disposed on the same side of the main fixing member 1. It should be noted that although the auxiliary fixing member 2 and the piezoelectric component 4 are ring-shaped elements and the atomization component 3 is a disc-shaped element in this embodiment, the above is merely an example, and is not meant to limit the scope of the present disclosure.

Next, reference is made to FIG. 3, in which the atomization component 3 contacts the first bonding surface 111 of the first bonding part 11 and the second bonding surface 21 of the auxiliary fixing member 2 at the same time. The auxiliary fixing member 2 can have an outer diameter greater than a diameter of the atomization component 3, and the first bonding surface 111 also has an outer diameter greater than the diameter of the atomization component 3. That is, a periphery of the atomization component 3 without the plurality of through holes 30 is completely covered by a vertical projection formed by the outer diameter of the auxiliary fixing member 2 and a vertical projection formed by the outer diameter of the first bonding surface 111.

In the present disclosure, the main fixing member 1 has a first adhesive groove GS1, and the main fixing member 1, the auxiliary fixing part 2 and the atomization component 3 jointly define at least the first adhesive groove GS1. In this embodiment, when the piezoelectric component 4 and the atomization component 3 are disposed on the same side of the main fixing member 1, the main fixing member 1, the auxiliary fixing member 2, the atomization component 3 and the piezoelectric component 4 can jointly define the first adhesive groove GS1. A first adhesive A1 which contacts at least the main fixing member 1, the auxiliary fixing member 2 and the atomization component 3 is provided in the first adhesive groove GS1 to strengthen the bonding relationship among the main fixing member 1, the auxiliary fixing member 2 and the atomization component 3, so as to provide a stable structure. In the embodiment of the present disclosure, the atomization component 3 can be made of palladium-nickel alloy to provide better chemical resistance and mechanical strength, and a material of the first adhesive A1 can be epoxy resin, but the present disclosure is not limited thereto. In addition, the auxiliary fixing member 2 can be made of metal or other malleable materials.

However, it is necessary to further ensure that short circuit paths between the positive and negative electrodes of the piezoelectric component 4 will not be formed by the moisture generated during atomization penetrating into a gap between the piezoelectric component 4 and the main fixing member 1. Therefore, as shown in FIG. 3, the first adhesive A1 can contact the main fixing member 1, the auxiliary fixing member 2, the atomization component 3 and the piezoelectric component 4 at the same time. In detail, in the embodiment shown in FIG. 3, the first adhesive groove GS1 can be filled with the first adhesive A1 to increase the bonding relationship among the main fixing member 1, the auxiliary fixing member 2, the atomization component 3 and the piezoelectric component 4, thereby strengthening the overall structure of the atomization module M1 and effectively preventing moisture from penetrating into bonding interfaces among the atomization component 3, the main fixing member 1 and the auxiliary fixing member 2, so as to prevent moisture-induced short circuits between the positive and negative electrodes of the piezoelectric component 4.

Reference is further made to FIGS. 2 and 3, in which the piezoelectric component 4 has an inner surface 41 defining an opening 40 and an outer surface 42 opposite to the inner surface 41. The inner surface 41 faces the first bonding part 11, and the outer surface 42 and the second bonding part 12 jointly define a second adhesive groove GS2. As shown in FIG. 3, the second adhesive groove GS2 is an open-type groove, a second adhesive A2 that contacts at least the main fixing member 1 and the piezoelectric component 4 can be disposed in the second adhesive groove GS2. More precisely, the second adhesive A2 can contact the second bonding part 12 of the main fixing member 1 and the outer surface 42 of the piezoelectric component 4 at the same time, so as to encapsulate a junction at the outer surface 42 where the main fixing member 1 and the piezoelectric component 4 are bonded together in the second adhesive A2. A material of the second adhesive A2 can also be, for example, epoxy resin, but the present disclosure is not limited thereto.

In addition, the piezoelectric component 4 also has an upper surface 43 and a lower surface 44 disposed between the inner surface 41 and the outer surface 42, and the lower surface 44 contacts the second bonding part 12. In the embodiment shown in FIG. 3, filling the first adhesive groove GS1 with the first adhesive A1 refers to filling the first adhesive A1 to the same height as the upper surface 43. At this time, a top of the first adhesive A1 will be higher than the second bonding surface 21 of the atomization component 3 and the auxiliary fixing member 2. Therefore, it is possible to ensure that a bonding interface between the first bonding part 11 and the atomization component 3 and a bonding interface between the auxiliary fixing member 2 and the atomization component 3 are both covered by the first adhesive A1, thereby preventing moisture from penetrating therethrough.

However, in the embodiment of FIG. 3, an arrangement of the first adhesive A1 is merely one possible implementation, and the present disclosure is not limited thereto.

Figure 4:
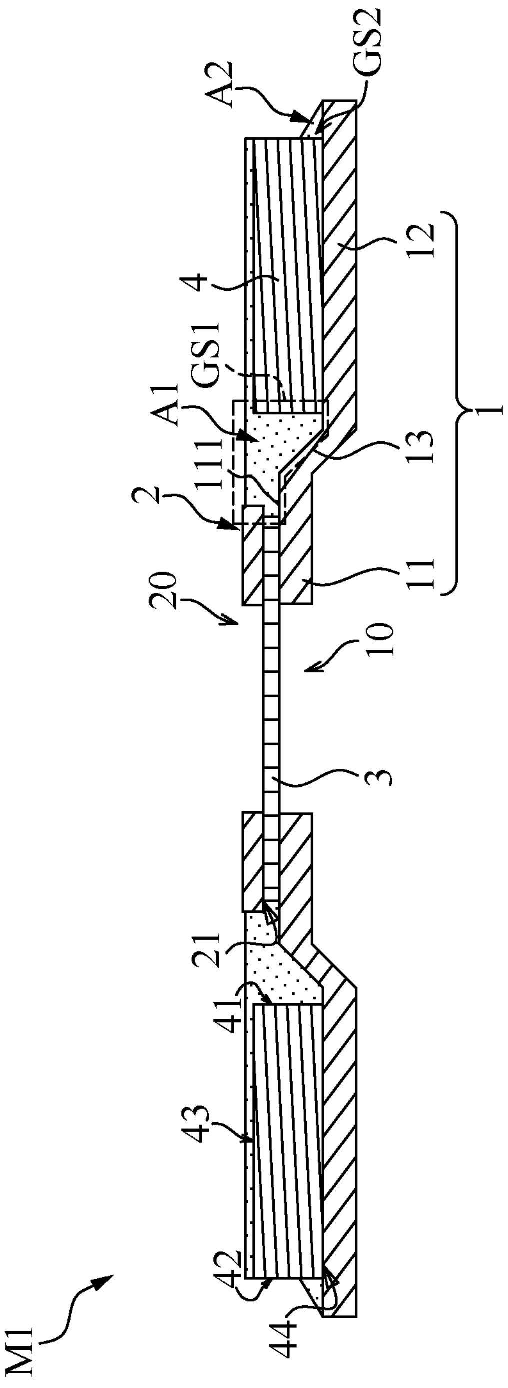
FIG. 4 is a schematic cross-sectional view of a second aspect taken along the line III-III of FIG. 1.

Reference is made to FIG. 4, which is a schematic cross-section view of a second aspect taken along the line III-III of FIG. 1. As shown in FIG. 4, in this embodiment, the auxiliary fixing member 2 does not completely cover the first adhesive groove GS1, and the first adhesive A1 overflows from the first adhesive groove GS1 and extends to the upper surface 43 of the piezoelectric component 4.

Figure 5:
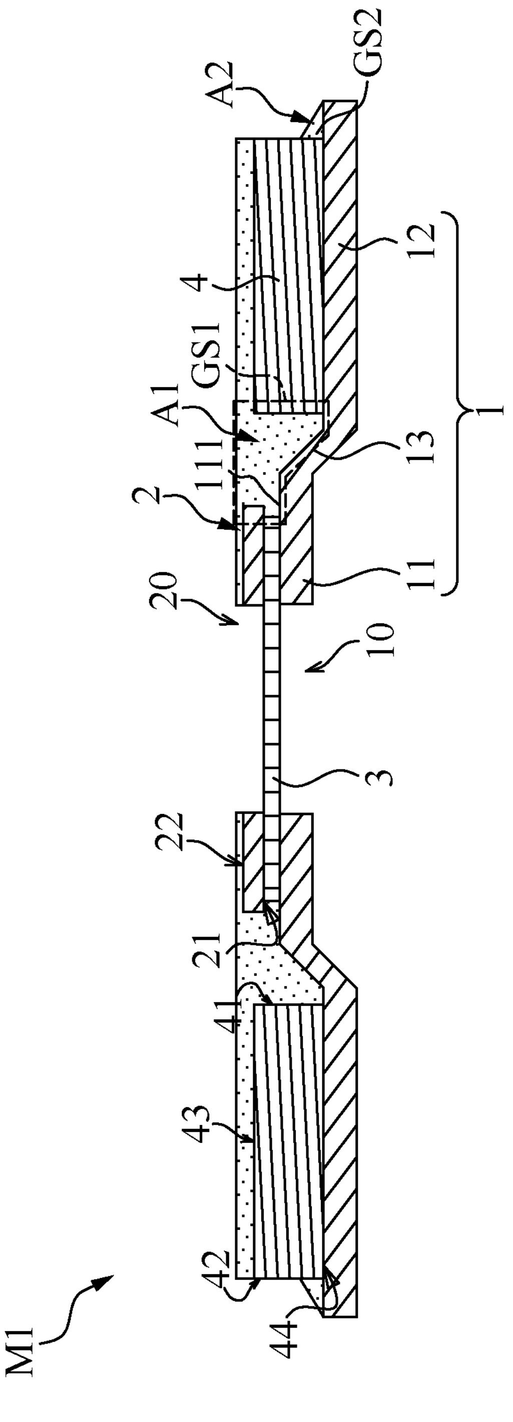
FIG. 5 is a schematic cross-sectional view of a third aspect taken along the line III-III of FIG. 1.

Reference is made to FIG. 5, which is a schematic cross-section view of a third aspect taken along the line III-III of FIG. 1. As shown in FIG. 5, in this embodiment, the first adhesive A1 not only overflows from the first adhesive groove GS1, but also extends to a third joint surface 22 of the auxiliary fixing member 2 and the upper surface 43 of the piezoelectric component 4. In this case, the third bonding surface 22 is a surface on an opposite side of the second bonding surface 21.

Figure 6:
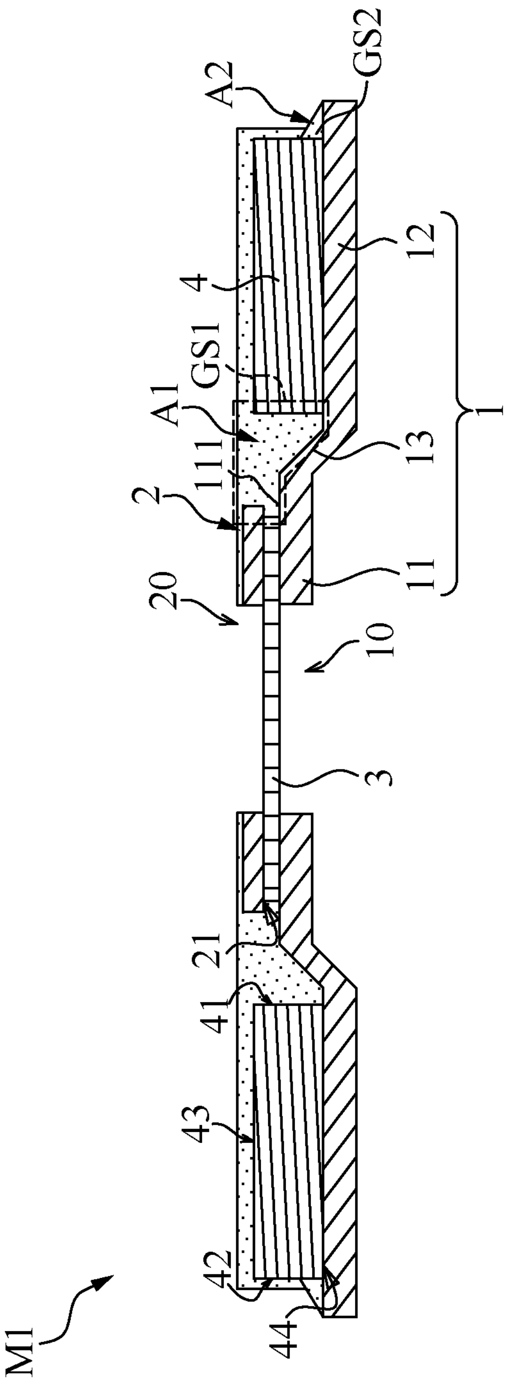
FIG. 6 is a schematic cross-sectional view of a fourth aspect taken along the line III-III of FIG. 1.

Reference is made to FIG. 6, which is a schematic cross-section view of a fourth aspect taken along the line III-III of FIG. 1. As shown in FIG. 6, in this embodiment, the first adhesive A1 not only overflows from the first adhesive groove GS1, but also extends to the third bonding surface 22 of the auxiliary fixing member 2, the upper surface 43 and the outer surface 42 of the piezoelectric component 4. In particular, the first adhesive A1 can meet the second adhesive A2 on the outer surface 42, and the first adhesive A1 and the second adhesive A2 can be made of the same or different materials.

It should be noted that the atomization module M1 in FIGS. 4 to 6 has stronger airtightness than the atomization module M1 in FIG. 3. The first adhesive A1 in FIG. 4 strengthens the airtightness of the upper surface 43 of the piezoelectric component 4. The first adhesive A1 in FIG. 5 strengthens the airtightness of the second bonding surface 21 of the auxiliary fixing member 2, and the first adhesive A1 and the second adhesive A2 in FIG. 6 completely cover the piezoelectric component 4, which can provide stronger protection against the moisture.

Figure 7:
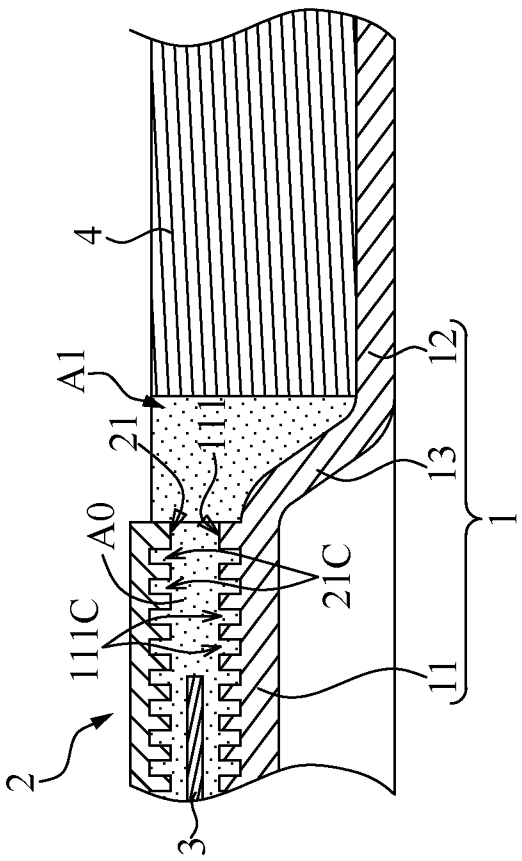
FIG. 7 is a detailed schematic diagram of the atomization module of FIG. 3.

Reference is made to FIG. 7, which is a detailed schematic diagram of the atomization module of FIG. 3. FIG. 7 particularly shows details of combination of the main fixing member 1, the auxiliary fixing member 2 and the atomization component 3. As shown in FIG. 7, a laser can be used to cut a surface of the first bonding surface 111 of the first bonding part 11, so as to form a plurality of first notches 111C. The second bonding surface 21 of the auxiliary fixing member 2 can also be used to cut a plurality of second notches 21C by the laser. When a component adhesive A0 is arranged in gaps among the first bonding surface 111, the second bonding surface 21 and the atomization component 3, the component adhesive A0 can be filled in the first notches 111C and the second notches 21C to increase a bonding area between the component adhesive A0 and the first bonding surface 111, and a bonding area between the component adhesive A0 and the second bonding surface 21. In one preferred embodiment, each of the first notches 111C and each of the second notches 21C has a width ranging from 80 μm to 120 μm and a depth ranging from 10 μm to 20 μm, but the present disclosure is not limited thereto.

It should be noted that, in addition to providing notches on the above-mentioned first bonding surface 111 and second bonding surface 21, notches can be provided on all contact surfaces between components and between any of the components and the adhesive. For example, in FIG. 3 to FIG. 6, a contact surface between the main fixing member 1 and the atomization component 3, a contact surface between the auxiliary fixing member 2 and the atomization component 3, a contact surface between the main fixing member 1 and the piezoelectric component 4, all surfaces defining the first adhesive groove GS1, all surfaces defining the second adhesive groove GS2, all surfaces in contact with the first adhesive A1, and all surfaces in contact with the second adhesive A2 can be provided with multiple notches to increase adhesion area thereof.

In other embodiments, the above-mentioned surfaces provided with the notches can also be replaced with rough surfaces after roughening treatment or patterned surfaces after patterning treatment. Through designs of the notches, the rough surfaces and/or the patterned surfaces, adhesive force of the component adhesive A0 among the main fixing member 1, the auxiliary fixing member 2 and the atomization component 3 can be increased, and adhesive force of the first adhesive A1 and the second adhesive A2 relative to the component surface can be increased, thereby improving the overall structural strength of the atomization module M1.

On the other hand, in the above-mentioned embodiments of FIG. 3 to FIG. 7, an arrangement of the auxiliary fixing member 2 is merely one possible implementation, and the present disclosure is not limited thereto.

Figure 8:
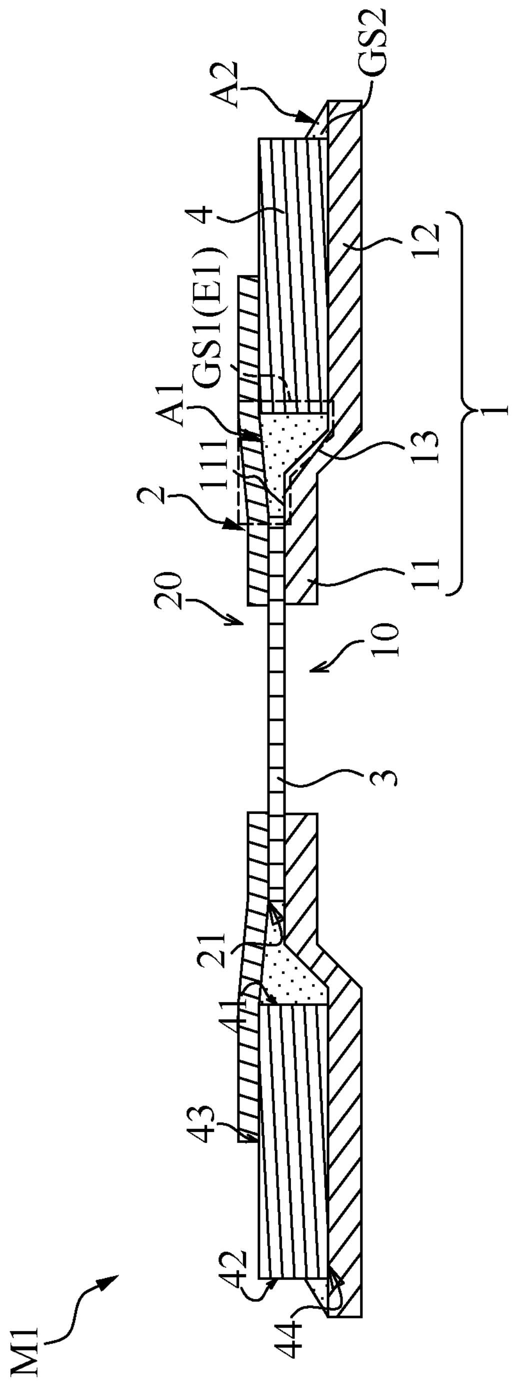
FIGS. 8 to 10 are schematic cross-sectional views of the atomization module according to the first embodiment of the present disclosure using different auxiliary fixing members.
Figure 9:
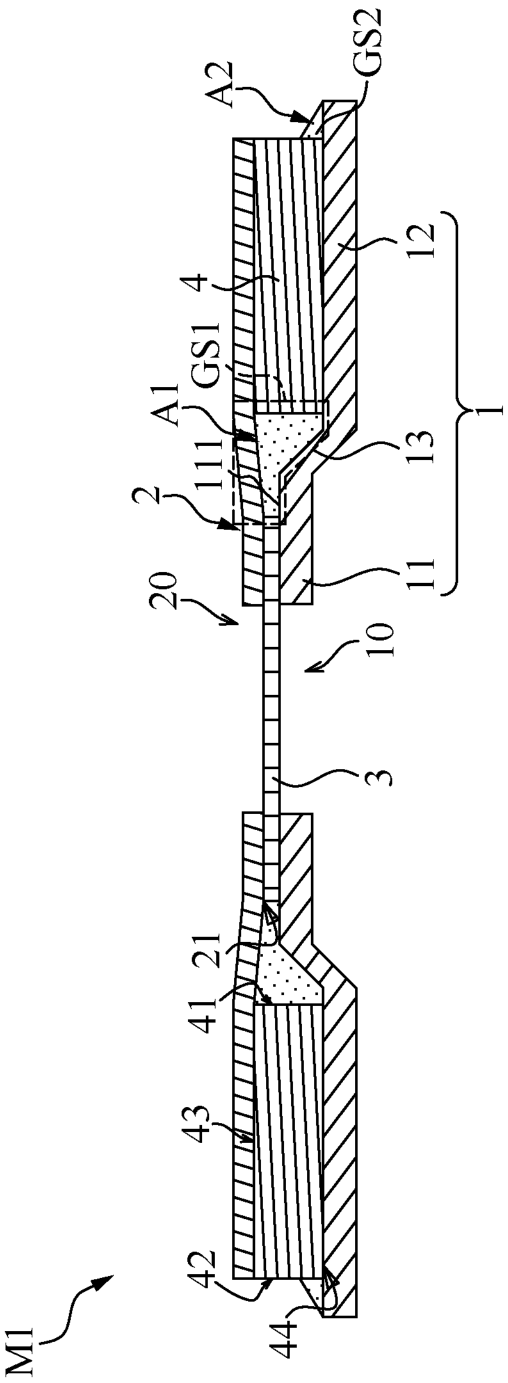
Figure 10:
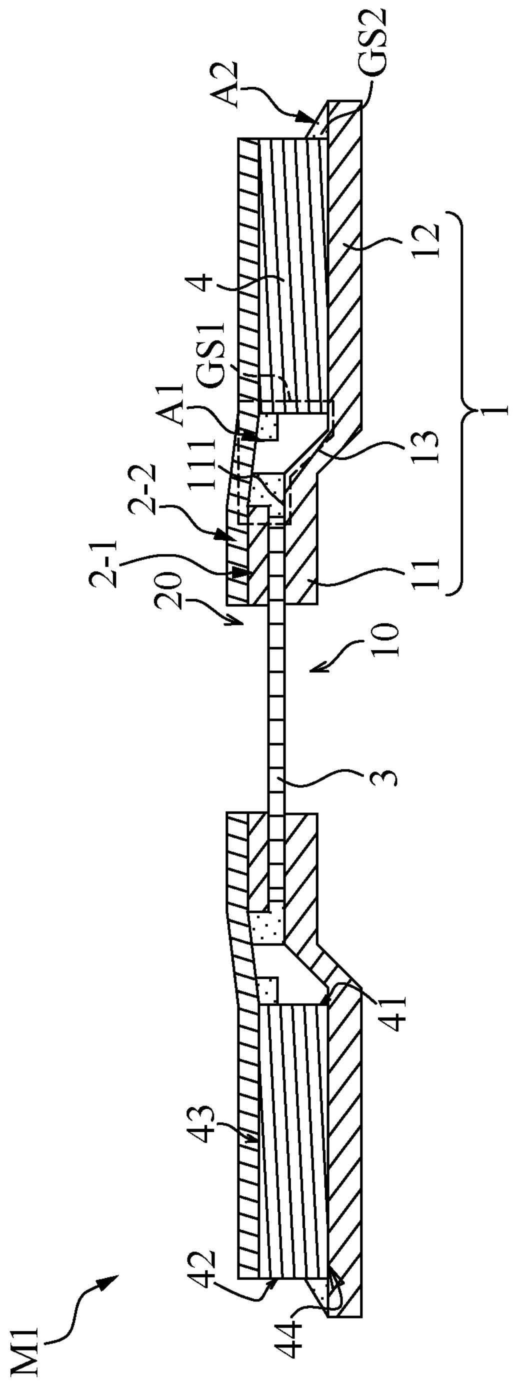

FIGS. 8 to 10 are schematic cross-sectional views of the atomization module according to the first embodiment of the present disclosure using different auxiliary fixing members. As shown in FIG. 8, in this embodiment, the auxiliary fixing member 2 can be made of a ductile insulating material, for example, a polymer film with polyimide (PI). The auxiliary fixing member 2 completely covers the first adhesive groove GS1, a part of the auxiliary fixing member 2 is connected to the atomization component 3, and another part of the auxiliary fixing member 2 is connected to the piezoelectric component 4. In this case, the piezoelectric component 4, the main fixing member 1, the auxiliary fixing member 2 and the atomization component 3 will form an enclosed space E1 that defines the first adhesive groove GS1.

It should be noted that part or all of the enclosed space E1 can be filled with the first adhesive A1. As shown in FIG. 8, the first adhesive A1 fills the entire enclosed space E1. In this case, the auxiliary fixing member 2 can be more stably arranged on the atomization component 3 and the piezoelectric component 4, and at the same time, another protective film can be formed for the first adhesive groove GS1, making it more difficult for moisture to penetrate into gaps among the main fixing member 1, the auxiliary fixing member 2 and the atomization component 3, and a gap between the piezoelectric component 4 and the main fixing member 1. In the present embodiment, although the auxiliary fixing member 2 only covers a part of the piezoelectric component 4, an anti-moisture infiltration effect can be achieved to a certain extent. In addition, reference can be made to an embodiment of FIG. 9, where compared to the atomization module M1 of FIG. 8, the auxiliary fixing member 2 completely covers the piezoelectric component 4 to provide the piezoelectric component 4 with an effect similar to a protective layer.

Reference is further made to FIG. 10, the auxiliary fixing member 2 can include a first auxiliary fixing member 2-1 and a second auxiliary fixing member 2-2. The first auxiliary fixing member 2-1 is similar to the auxiliary fixing member 2 in FIGS. 3 to 7, and can be made of, for example, metal. The second auxiliary fixing member 2-2 is similar to the auxiliary fixing member 2 in FIGS. 8 and 9, and can be made of a ductile insulating material and disposed above the first auxiliary fixing member 2-1.

In the present embodiment, a part of the second auxiliary fixing member 2-2 is connected to the first auxiliary fixing member 2-1, and another part of the second auxiliary fixing member 2-1 is connected to the piezoelectric component 4. Therefore, the piezoelectric component 4, the main fixing member 1, the first auxiliary fixing member 2-1, the second auxiliary fixing member 2-2 and the atomization component 3 will form an enclosed space E1 to define the first adhesive groove GS1.

Different from the embodiments shown in FIG. 8 and FIG. 9, the first adhesive A1 does not fill the entire enclosed space E1. For example, as shown in FIG. 10, a first part of the first adhesive A1 can be filled in the enclosed space E1 at a side close to the atomization component 3, for example, the first part can contact the first bonding part 11, the atomization component 3, the first auxiliary fixing member 2-1 and the second auxiliary fixing member 2-2 at the same time. Furthermore, a second part of the first adhesive A1 can be filled in the enclosed space E1 at a side away from the atomization component 3 (that is, a side close to the piezoelectric component 4), for example, the second part can contact the second auxiliary fixing member 2-2 and the piezoelectric component 4 at the same time. In this way, the first adhesive A1 can be disposed in a cost-effective manner, while still achieving a similar effect of preventing moisture from infiltrating into gaps among the components; the second auxiliary fixing member 2-2 also provides the first adhesive A1 with an effect similar to a protective layer, and improves reliability and durability of the first adhesive A1 by preventing the first adhesive A1 from coming in direct contact with the external environment.

In addition, the piezoelectric component 4 has electrodes for receiving an input voltage, by which the piezoelectric component 4 can be driven to vibrate, so as to drive the atomization component 3 to vibrate together, such that the medicinal liquid in the atomization module can be sprayed to the external environment in a form of aerosol when passing through the through holes 30 of the vibrating atomization component 3. In general, the piezoelectric component 4 has a Polytetrafluoroethene (PTFE) coating layer on the outside. However, in some of the embodiments where the piezoelectric component 4 is covered by the adhesive, since an appropriate protective layer has been formed on the piezoelectric component 4, the PTFE coating layer can be omitted to save costs.

Second Embodiment

Figure 11:
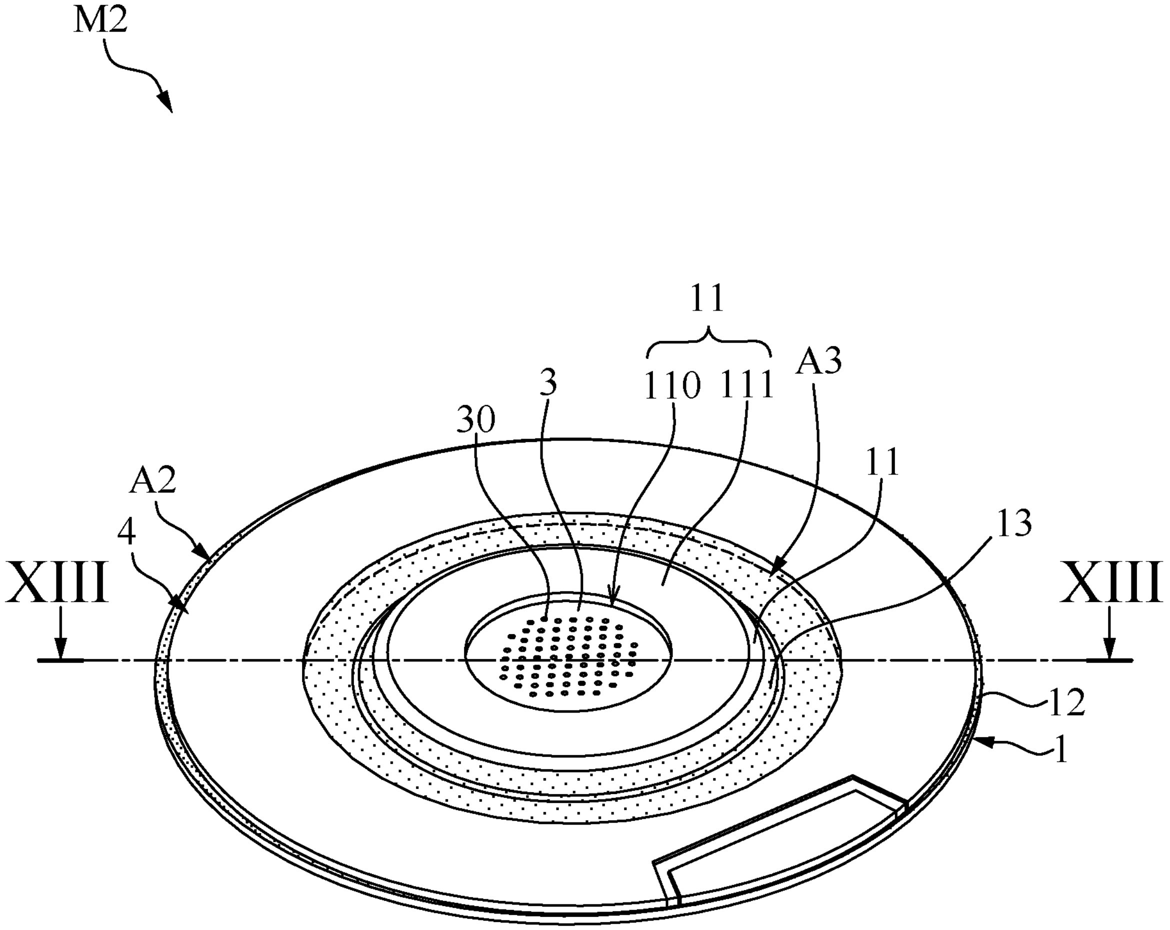
FIG. 11 is a schematic diagram of an atomization module according to a second embodiment of the present disclosure.
Figure 12:
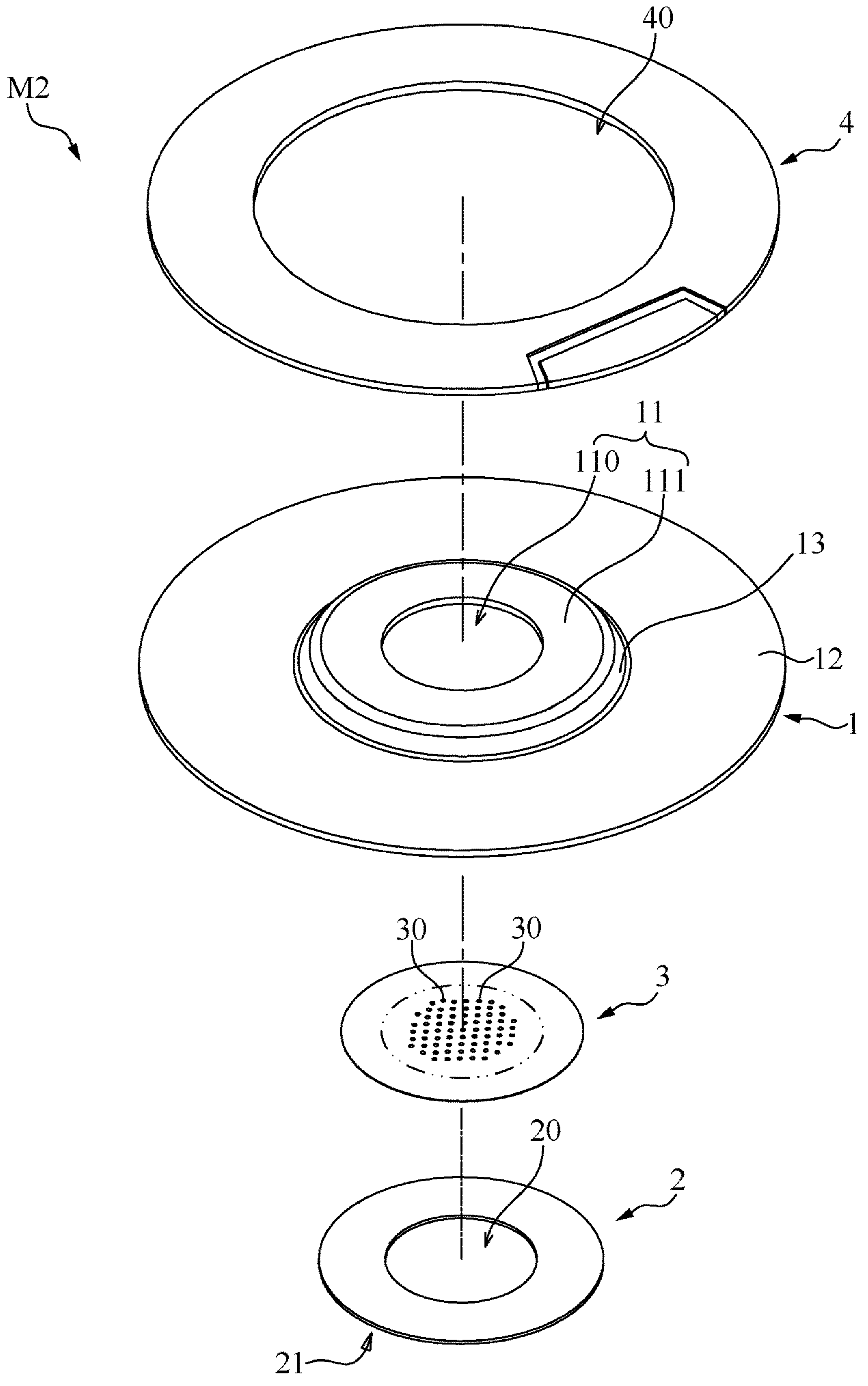
FIG. 12 is an exploded schematic view of the atomization module according to the second embodiment of the present disclosure.

FIG. 11 is a schematic diagram of an atomization module according to a second embodiment of the present disclosure, and FIG. 12 is an exploded schematic view of the atomization module according to the second embodiment of the present disclosure. Reference is made to FIG. 11 and FIG. 12, the second embodiment of the present disclosure provides an atomization module M2, which includes a main fixing member 1, an auxiliary fixing member 2, an atomization component 3 and a piezoelectric component 4. It should be noted that a configuration of the atomization module M2 of the second embodiment is similar to that of the atomization module M1 of the first embodiment, and the only differences will be described in detail below, with repeated descriptions being omitted. Components similar to those of the first embodiment are denoted with similar reference numerals.

As shown in FIG. 11 and FIG. 12, in this embodiment, the piezoelectric component 4 and the atomization component 3 are disposed on different sides of the main fixing member 1.

Although the first bonding part 11 of the main fixing member 1 is still a raised platform, in this embodiment, the auxiliary fixing member 2 is disposed below the raised platform. That is, viewed from another side of the main fixing member 1, the first bonding part 11 of the main fixing member 1 can be regarded as a sunken platform, and the atomization component 3 and the auxiliary fixing member 2 are arranged in a depression formed by the sunken platform. More specifically, in this embodiment, although definitions of the first bonding surface 111 and the second bonding surface 21 are similar to those of the first embodiment, the first bonding surface 111 and the piezoelectric component 4 are respectively located on different sides of the main fixing member 1.

Figure 13:
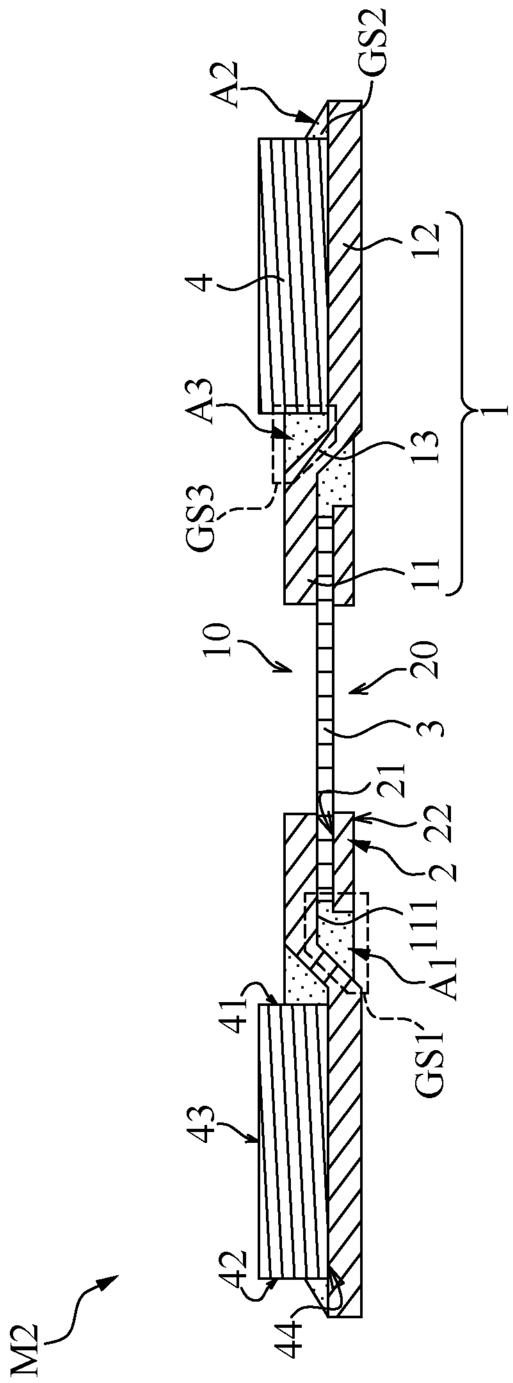
FIG. 13 is a schematic cross-sectional view of a first aspect taken along line XIII-XIII of FIG. 11.

Reference is made to FIG. 13, which is a schematic cross-sectional view of a first aspect taken along line XIII-XIII of FIG. 11. Similar to the previous embodiments, the connecting part 13 is inclined relative to the first bonding part 11 and the second bonding part 12, the piezoelectric component 4 has an inner surface 41 facing the first bonding part 11 and an outer surface 42 opposite to the inner surface 41, and the outer surface 42 and the second bonding part 12 jointly define the second adhesive groove GS2. In addition, different from the first embodiment, in the atomization module M2 of the second embodiment, the first adhesive groove GS1 is defined by the first bonding surface 111 of the first bonding part 11, the connecting part 13, the auxiliary fixing member 2, and the atomization component 3, and the inner surface 41 of the piezoelectric component 4 and the connecting part 13 define a third adhesive groove GS3.

Since configurations of the second adhesive A2 and the second adhesive groove GS2 are the same as those of the first embodiment, the details thereof will not be repeated herein. It should be noted that a third adhesive A3 is provided in the third adhesive groove GS3 to contact at least the main fixing member 1 and the inner surface 41. The third adhesive A3 can be made of epoxy resin, for example, but the present disclosure is not limited thereto.

In the embodiment shown in FIG. 13, the first adhesive groove GS1 can be filled with the first adhesive A1 to increase adhesive relationships among the main fixing member 1, the auxiliary fixing member 2 and the atomization component 3, thereby strengthening the overall structure of one side of the atomization module M2 and effectively preventing moisture from infiltrating into the bonding interfaces among the atomization component 3, the main fixing member 1 and the auxiliary fixing member 2. Similarly, the third adhesive groove GS3 can be filled with the third adhesive A3 to increase the bond strength across a bonding interface between the main fixing member 1 and the piezoelectric component 4, thereby strengthening the overall structure of the other side of the atomization module M2 and effectively preventing moisture from infiltrating into the bonding interface between the main fixing member 1 and the piezoelectric component 4.

Here, filling the first adhesive groove GS1 with the first adhesive A1 means filling the first adhesive A1 to the same height as the upper surface 43, and filling the third adhesive groove GS3 with the third adhesive A3 means filling the third adhesive A3 to the same height as the first bonding part 11. Similar to the filling methods shown in FIGS. 4 to 6, the third adhesive A3 can overflow from the third adhesive groove GS3 to cover the piezoelectric component 4, and even meet the second adhesive A2 to completely cover the piezoelectric component 4, the advantages of which will not be repeated herein.

In the embodiment of FIG. 13, the auxiliary fixing member 2 does not completely cover the first adhesive groove GS1; therefore, the first adhesive groove GS1 can also be filled in various ways.

Figure 14:
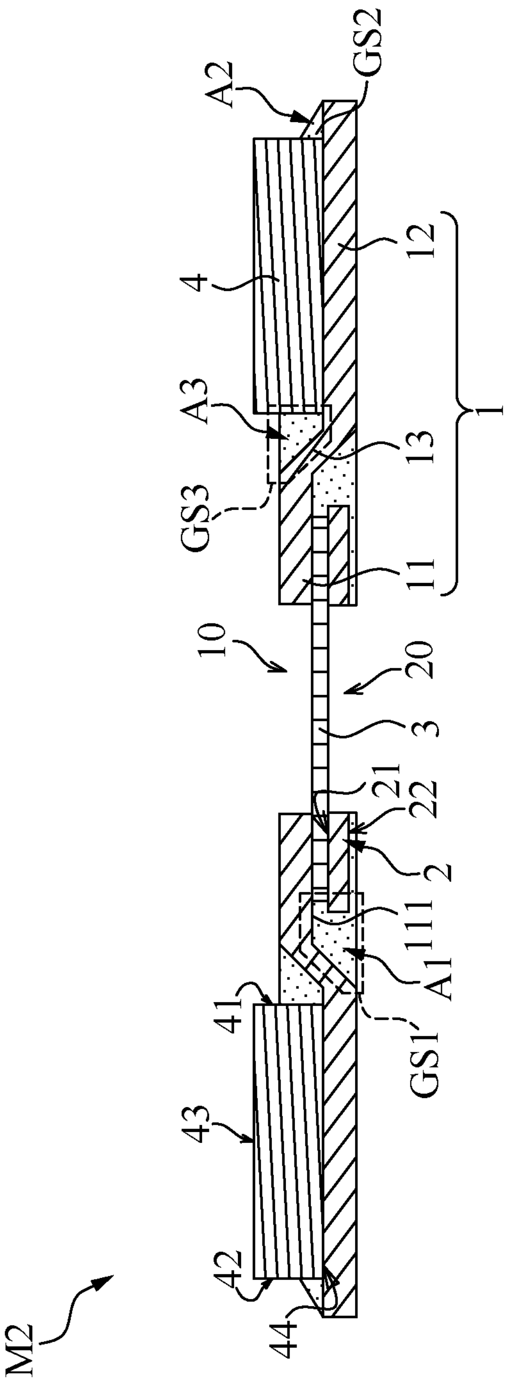
FIG. 14 is a schematic cross-sectional view of a second aspect taken along the line XIII-XIII of FIG. 11.

Reference is made to FIG. 14, which is a schematic cross-sectional view of a second aspect taken along the line XIII-XIII of FIG. 11. As shown in FIG. 14, in this embodiment, the auxiliary fixing member 2 does not completely cover the first adhesive groove GS1, the first adhesive A1 overflows from the first adhesive groove GS1 and extends to the third bonding surface 22 of the auxiliary fixing member 2, and the third bonding surface 22 is opposite to the second bonding surface 21.

Figure 15:
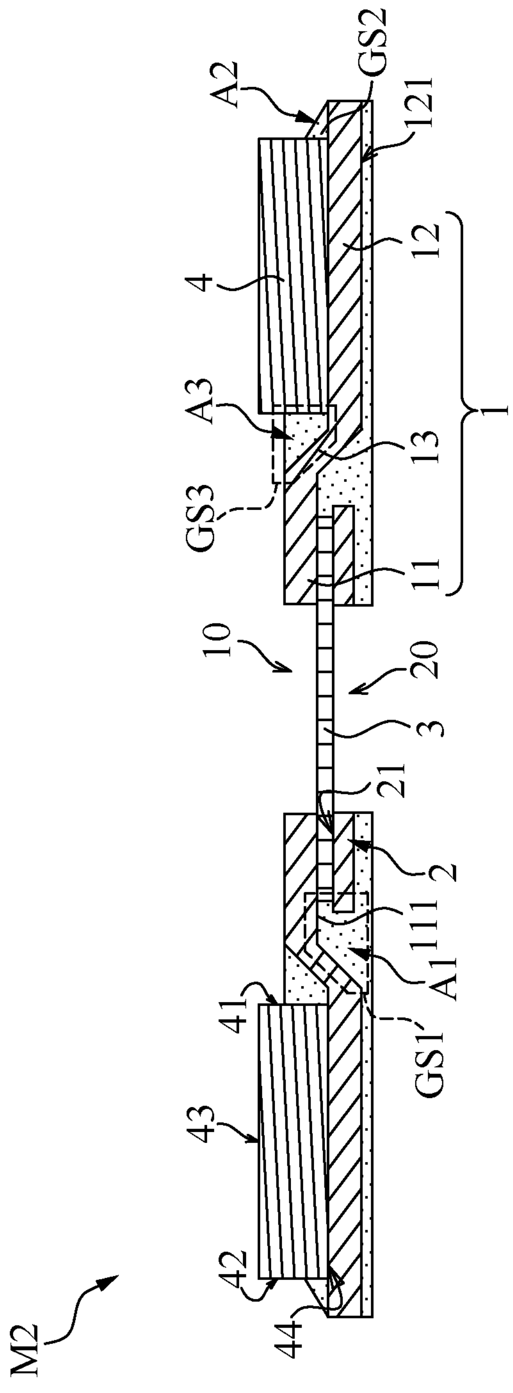
FIG. 15 is a schematic cross-sectional view of a third aspect taken along the line XIII-XIII of FIG. 11.

Reference is made to FIG. 15, which is a schematic cross-sectional view of a third aspect taken along the line XIII-XIII of FIG. 11. As shown in FIG. 15, in this embodiment, the first adhesive A1 not only overflows from the first adhesive groove GS1, but also extends to a bottom surface 121 of the second bonding portion 12 that is not in contact with the piezoelectric component 4.

Compared with the atomization module M2 of FIG. 13, the first adhesive A1 of the atomization module M2 of FIG. 14 can form a protective layer for the auxiliary fixing member 2, while the first adhesive A1 of the atomization module M2 of FIG. 15 can further form another protective layer for the bottom surface 121 of the second bonding part 12.

On the other hand, in the above-mentioned embodiments of FIG. 13 to FIG. 15, the arrangement of the auxiliary fixing member 2 is only one possible implementation, and the present disclosure is not limited thereto.

Figure 16:
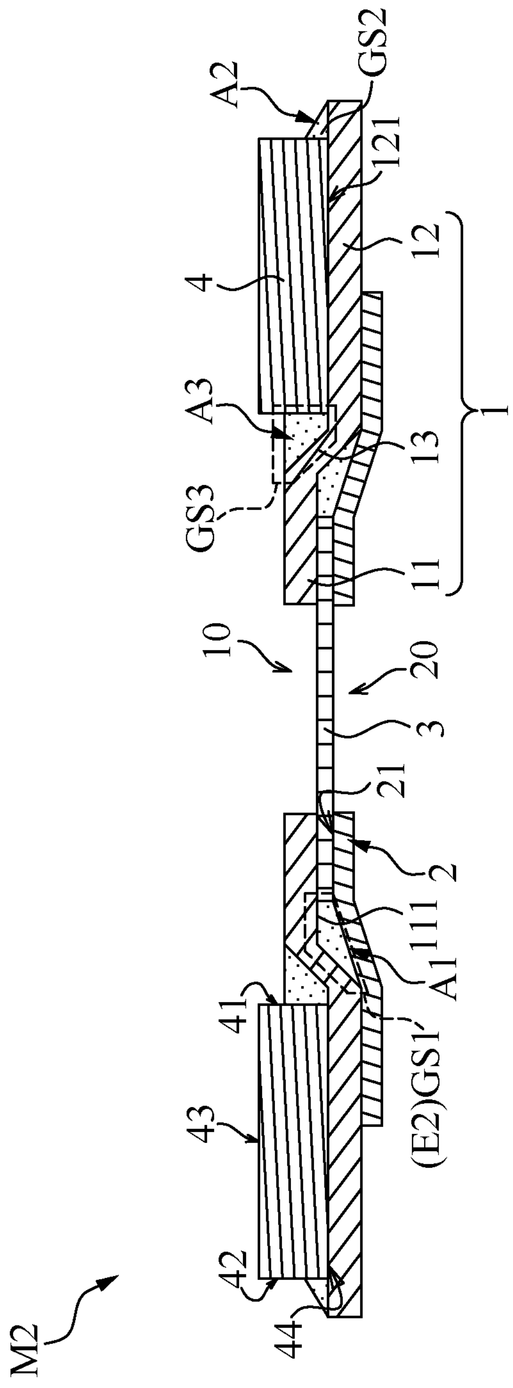
FIGS. 16 and 17 are respectively various cross-sectional schematic views of the atomization module according to the second embodiment of the present disclosure using different auxiliary fixing members.
Figure 17:
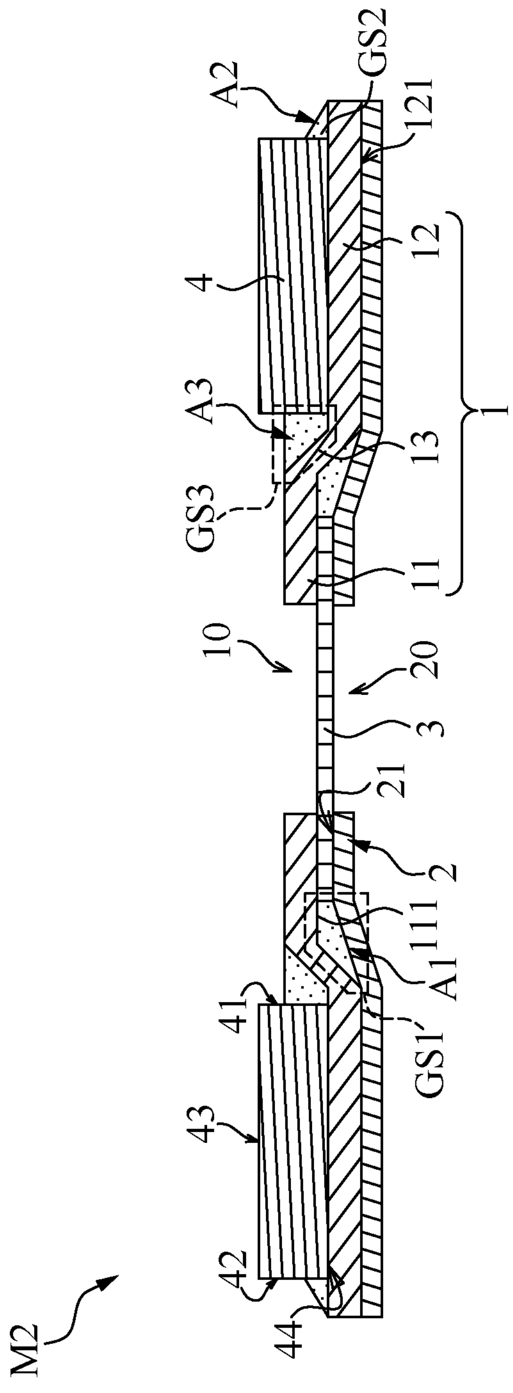

FIGS. 16 and 17 are respectively various cross-sectional schematic views of the atomization module according to the second embodiment of the present disclosure using different auxiliary fixing members. As shown in FIG. 16, in this embodiment, the auxiliary fixing member 2 can be made of, for example, a ductile insulating material, such as a polymer film with polyimide (PI). The auxiliary fixing member 2 completely covers the first adhesive groove GS1, a part of the auxiliary fixing member 2 is connected to the atomization component 3, and another part of the auxiliary fixing member 2 is connected to the bottom surface 121 of the second bonding part 12. In this case, the connecting part 13, the auxiliary fixing member 2 and the atomization component 3 will form an enclosed space E2 that defines the first adhesive groove GS1.

It should be noted that a part or all of the enclosed space E2 can be filled with the first adhesive A1. As shown in FIG. 16, the first adhesive A1 fills the entire enclosed space E2. In this case, a bonding force between the auxiliary fixing member 2 and the first adhesive A1 will enable the auxiliary fixing member 2 to be more stably disposed on the atomization component 3 and the bottom surface 121 of the second bonding part 12. At the same time, another protective film can be formed for the first adhesive groove GS1, making it more difficult for moisture to penetrate into gaps among the main fixing member 1, the auxiliary fixing member 2 and the atomization component 3. In this embodiment, although the auxiliary fixing member 2 only covers a part of the bottom surface 121 of the second bonding part 12, an anti-moisture infiltration effect can still be achieved to a certain extent.

On the other hand, in the embodiment shown in FIG. 17, compared to the atomization module M2 in FIG. 14, the auxiliary fixing member 2 completely covers the bottom surface 121 of the second bonding part 12, so that the auxiliary fixing member 2 can provide an effect similar to a protective layer for the second bonding part 12, while enhancing the bonding force between the auxiliary fixing member 2 and the second bonding part 12, making the structure of the atomization module M2 more stable.

It should be noted that, similar to the first embodiment, the first bonding surface 111 and the second bonding surface 21 can each be provided with a plurality of notches, and contact surfaces among all the components and contact surfaces among the components and the adhesive can be provided with such notches. For example, in FIG. 13 to FIG. 15, a contact surface between the main fixing member 1 and the atomization component 3, a contact surface between the auxiliary fixing member 2 and the atomization component 3, a contact surface between the main fixing member 1 and the piezoelectric component 4, all surfaces defining the first adhesive groove GS1, all surfaces defining the second adhesive groove GS2, all surfaces defining the third adhesive groove GS3, all surfaces in contact with the first adhesive A1, all surfaces in contact with the second adhesive A2 and all surfaces in contact with the third adhesive A3 can be provided with multiple notches to increase adhesion area thereof.

In other embodiments, the above-mentioned surfaces provided with the notches can also be replaced with rough surfaces after roughening treatment or patterned surfaces after patterning treatment. Through designs of the notches, the rough surfaces and/or the patterned surfaces, the bonding force among the main fixing member 1, the auxiliary fixing member 2 and the atomization component 3 can be increased, and the bonding force of the first adhesive A1, the second adhesive A2 and the third adhesive A3 relative to a surface of each component can be increased, thereby improving the overall structural strength of the atomization module M2.

In addition, the piezoelectric component 4 has electrodes for receiving an input voltage, by which the piezoelectric component 4 can be driven to vibrate, so as to drive the atomization component 3 to vibrate together, such that the medicinal liquid in the atomization module can be sprayed to the external environment in a form of aerosol when passing through the through holes 30 of the vibrating atomization component 3. In general, the piezoelectric component 4 has a PTFE coating layer on the outside. However, in some of the embodiments where the piezoelectric component 4 is covered by the adhesive, since an appropriate protective layer has been formed on the piezoelectric component 4, the PTFE coating layer can be omitted to save costs.

Beneficial Effects of the Embodiments

In conclusion, in the atomization module provided by the present disclosure, the first adhesive groove can be filled with adhesive to increase bonding strengths among the main fixing member, the atomization component, and the auxiliary fixing member, thereby strengthening an overall structure of the atomization module. In addition, moisture can be prevented from penetrating through bonding interfaces among the atomization component, the main fixing member, and the auxiliary fixing member, so as to avoid short circuit paths between the positive and negative electrodes of the piezoelectric component due to moisture permeation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An atomization module, comprising:

a main fixing member, including:

a first bonding part having a first opening and a first bonding surface surrounding the first opening; and a second bonding part and a connecting part, wherein the connecting part has an inclination angle between 35 degrees and 45 degrees relative to a virtual horizontal plane that is coplanar with the second bonding part, the second bonding part is connected to the first bonding part through the connecting part, and the connecting part and the second bonding part surround the first bonding part;

an auxiliary fixing member disposed on the first bonding part, wherein the auxiliary fixing member has a second opening and a second bonding surface surrounding the second opening, and the second bonding surface faces the first bonding surface;

an atomization component disposed between the main fixing member and the auxiliary fixing member; and a piezoelectric component disposed on the second bonding part and surrounding the first bonding part;

wherein the main fixing member has a first adhesive groove, the main fixing member, the auxiliary fixing member and the atomization component jointly define the first adhesive groove, and a first adhesive that contacts the main fixing member, the auxiliary fixing member and the atomization component is provided in the first adhesive groove;

wherein the main fixing member transmits a vibration generated by the piezoelectric component to the atomization component, and wherein the auxiliary fixing member cooperates with the main fixing member to jointly clamp the atomization component.

2. The atomization module according to claim 1, wherein the piezoelectric component and the atomization component are disposed on a side of the main fixing member, and the main fixing member, the auxiliary fixing member, the atomization component and the piezoelectric component jointly define the first adhesive groove.

3. The atomization module according to claim 2, wherein the connecting part is inclined relative to the first bonding part and the second bonding part, and the first adhesive further contacts the piezoelectric component.

4. The atomization module according to claim 2, wherein the piezoelectric component has an inner surface facing the first bonding part and an outer surface opposite to the inner surface, and the outer surface and the second bonding part jointly define a second adhesive groove.

5. The atomization module according to claim 4, wherein a second adhesive is provided in the second adhesive groove and contacts at least the main fixing member and the piezoelectric component.

6. The atomization module according to claim 5, wherein the piezoelectric component has an upper surface and a lower surface that are disposed between the inner surface and the outer surface, and the lower surface contacts the second bonding part.

7. The atomization module according to claim 6, wherein the auxiliary fixing member does not completely cover the first adhesive groove, and the first adhesive overflows from the first adhesive groove and extends to the upper surface of the piezoelectric component.

8. The atomization module according to claim 6, wherein the auxiliary fixing member completely covers the first adhesive groove, a part of the auxiliary fixing member is connected to the atomization component, and another part of the auxiliary fixing member is connected to the piezoelectric component.

9. The atomization module according to claim 8, wherein the piezoelectric component, the main fixing member, the auxiliary fixing member and the atomization component form an enclosed space to define the first adhesive groove.

10. The atomization module according to claim 1, wherein the piezoelectric component and the atomization component are arranged on different sides of the main fixing member.

11. The atomization module according to claim 10, wherein the connecting part is inclined relative to the first bonding part and the second bonding part, the piezoelectric component has an inner surface facing the first bonding part and an outer surface opposite to the inner surface, the outer surface and the second bonding part jointly define a second adhesive groove, and the inner surface and the connecting part jointly define a third adhesive groove.

12. The atomization module according to claim 11, wherein a second adhesive that contacts at least the main fixing member and the outer surface of the piezoelectric component is provided in the second adhesive groove, and a third adhesive that contacts at least the main fixing member and the inner surface of the piezoelectric component is provided in the third adhesive groove.

13. The atomization module according to claim 12, wherein the piezoelectric component has an upper surface and a lower surface that are disposed between the inner surface and the outer surface, and the lower surface contacts the second bonding part.

14. The atomization module according to claim 13, wherein the auxiliary fixing member does not completely cover the first adhesive groove, and the first adhesive overflows from the first adhesive groove and extends to a third bonding surface of the auxiliary fixing part, and the third bonding surface is opposite to the second bonding surface.

15. The atomization module according to claim 14, wherein the first adhesive overflows from the first adhesive groove and extends to a bottom surface of the second bonding part that is not in contact with the piezoelectric component.

16. The atomization module according to claim 13, wherein the auxiliary fixing member completely covers the first adhesive groove, a part of the auxiliary fixing member is connected to the atomization component, and another part of the auxiliary fixing member is connected to a bottom surface of the second bonding part which is not in contact with the piezoelectric component.

17. The atomization module according to claim 16, wherein the main fixing part, the auxiliary fixing part and the atomization component form an enclosed space to define the first adhesive groove.

18. An atomization module, comprising:

a main fixing member, including:

a first bonding part having a first opening and a first bonding surface surrounding the first opening, wherein the first bonding surface is provided with a plurality of first notches; and a second bonding part and a connecting part, wherein the connecting part has an inclination angle between 35 degrees and 45 degrees relative to a virtual horizontal plane that is coplanar with the second bonding part, the second bonding part is connected to the first bonding part through the connecting part, and the connecting part and the second bonding part surround the first bonding part;

an auxiliary fixing member disposed on the first bonding part, wherein the auxiliary fixing member has a second opening and a second bonding surface surrounding the second opening, the second bonding surface is provided with a plurality of second notches, the second bonding surface faces the first bonding surface, and the plurality of first notches and the plurality of second notches are arranged to face each other;

an atomization component disposed between the main fixing member and the auxiliary fixing member; and a piezoelectric component disposed on the second bonding part and surrounding the first bonding part;

wherein the main fixing member has a first adhesive groove, the main fixing member, the auxiliary fixing member and the atomization component jointly define the first adhesive groove, and a first adhesive that contacts the main fixing member, the auxiliary fixing member and the atomization component is provided in the first adhesive groove.

* * * * *